US011003478B2

(12) United States Patent
Grehan

(10) Patent No.: US 11,003,478 B2
(45) Date of Patent: May 11, 2021

(54) SYSTEMS AND METHODS FOR PROTECTING VIRTUAL MACHINES RUNNING ON SOFTWARE-DEFINED STORAGE

(71) Applicant: SCHNEIDER ELECTRIC IT CORPORATION, West Kingston, RI (US)

(72) Inventor: David Grehan, Claremorris (IE)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 1 day.

(21) Appl. No.: 16/361,760

(22) Filed: Mar. 22, 2019

(65) Prior Publication Data

US 2020/0183725 A1 Jun. 11, 2020

Related U.S. Application Data

(60) Provisional application No. 62/777,954, filed on Dec. 11, 2018.

(51) Int. Cl.
*G06F 3/00* (2006.01)
*G06F 9/455* (2018.01)
*G06F 3/06* (2006.01)

(52) U.S. Cl.
CPC .......... *G06F 9/45558* (2013.01); *G06F 3/067* (2013.01); *G06F 3/0614* (2013.01); *G06F 3/0647* (2013.01); *G06F 3/0664* (2013.01); *G06F 2009/4557* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

2015/0128052 A1* 5/2015 Grehan ............... G06F 9/45558
715/735

FOREIGN PATENT DOCUMENTS

EP 2871553 A1 5/2015

OTHER PUBLICATIONS

Extended European Search Report from corresponding European Application No. 19213860.0 dated Mar. 3, 2020.

* cited by examiner

*Primary Examiner* — Midys Rojas
(74) *Attorney, Agent, or Firm* — Lando & Anastasi, LLP

(57) ABSTRACT

According to aspects of the present disclosure, a method of operating a virtual storage area network cluster including a plurality of hosts is provided, each host of the plurality of hosts executing at least one Virtual Machine (VM) and being configured to receive power from a respective Uninterruptible Power Supply (UPS) of a plurality of UPSs, the method comprising acts of determining a number of critical UPSs of the plurality of UPSs, each critical UPS of the plurality of UPSs corresponding to a critical host of the plurality of hosts, determining that the number of critical UPSs does not exceed a fault tolerance level, and migrating VMs hosted by the critical hosts to non-critical hosts of the plurality of hosts.

20 Claims, 5 Drawing Sheets

SYSTEMS AND METHODS FOR PROTECTING VIRTUAL MACHINES RUNNING ON SOFTWARE-DEFINED STORAGE

CROSS-REFERENCE TO RELATED APPLICATION

This application claims priority to U.S. Provisional Application Ser. No. 62/777,954, titled "SYSTEMS AND METHODS FOR PROTECTING VIRTUAL MACHINES RUNNING ON SOFTWARE-DEFINED STORAGE," filed on Dec. 11, 2018, which is incorporated herein by reference in its entirety.

BACKGROUND

1. Field of the Disclosure

At least one example in accordance with the present disclosure relates generally to virtual Storage Area Networks (SANs).

2. Discussion of Related Art

The use of Virtual Machines (VMs) to provide the functionality of a physical computer architecture is known. VMs are hosted by host servers executing hypervisors, which manage the VMs. Host servers may be aggregated in a virtual SAN cluster. In some cases, host servers may receive power from power devices, such as Uninterruptible Power Supplies (UPSs), to ensure access to regulated, uninterrupted power. UPSs may provide AC power derived from a primary source of AC power, such as a grid, as well as back-up AC power upon interruption of the primary source of AC power.

SUMMARY

According to at least one aspect of the present disclosure, a system for operating a virtual Storage Area Network (SAN) is provided, the system comprising a virtual SAN cluster comprising a plurality of hosts, wherein each host of the plurality of hosts is configured to execute a hypervisor, and wherein each hypervisor is configured to manage at least one Virtual Machine (VM), a plurality of Uninterruptible Power Supplies (UPSs), each UPS of the plurality of UPSs being coupled to a respective host of the plurality of hosts, and being configured to provide power to the respective host, and a computing device being communicatively coupled to the virtual SAN cluster and to the plurality of UPS s, and being configured to determine that the plurality of UPSs includes a first group of critical UPSs and a second group of non-critical UPSs, determine whether a number of UPS s in the first group of critical UPS s exceeds a fault tolerance level, and migrate, in response to determining that the number of UPSs in the first group of critical UPSs does not exceed a fault tolerance level, VMs managed by hypervisors executed by respective hosts coupled to the first group of critical UPSs to hypervisors executed by respective hosts coupled to the second group of non-critical UPSs.

In one embodiment, the computing device is further configured to control the hosts coupled to the first group of critical UPS s to enter a maintenance mode after migrating the VMs to the hypervisors executed by respective hosts coupled to the second group of non-critical UPSs. In an embodiment, the computing device is further configured to shut down, in response to determining that the number of UPSs in the first group of critical UPSs exceeds the fault tolerance level, VMs hosted by each host of the plurality of hosts. In embodiments, the computing device is further configured to control the hosts coupled to the first group of critical UPSs to enter a maintenance mode after shutting down the VMs hosted by each host of the plurality of hosts.

In some embodiments, the computing device is further configured to determine, subsequent to shutting down the VMs hosted by each host of the plurality of hosts, a condition for re-starting the VMs, determine whether the condition for re-starting the VMs is met, and re-start, responsive to determining that the condition for re-starting the VMs has been met, the VMs on the virtual SAN cluster. In an embodiment, the condition for re-starting the VMs includes each UPS of the plurality of UPSs being non-critical. In embodiments, the condition for re-starting the VMs includes a number of critical UPSs of the plurality of UPSs being equal to or less than the fault tolerance level.

In an embodiment, the fault tolerance level corresponds to a value indicative of a number of critical UPSs which may be concurrently sustained by the virtual SAN cluster. In at least one embodiment, the computing device includes a user interface, and wherein the computing device is further configured to receive, via the user interface, the value corresponding to the fault tolerance level.

According to one aspect of the disclosure, a method of operating a virtual Storage Area Network (SAN) cluster including a plurality of hosts is provided, each host of the plurality of hosts executing at least one Virtual Machine (VM) and being configured to receive power from a respective Uninterruptible Power Supply (UPS) of a plurality of UPSs, the method comprising determining a number of critical UPS s of the plurality of UPS s, each critical UPS of the plurality of UPSs corresponding to a critical host of the plurality of hosts, determining that the number of critical UPS s does not exceed a fault tolerance level, and migrating VMs hosted by the critical hosts to non-critical hosts of the plurality of hosts.

In at least one embodiment, the method further comprises controlling the critical hosts to enter a maintenance mode after migrating the VMs to the non-critical hosts. In an embodiment, the method further comprises shutting down, in response to determining that the number of critical hosts exceeds the fault tolerance level, VMs hosted by each host of the plurality of hosts. In embodiments, the method further comprises controlling the critical hosts to enter a maintenance mode after shutting down the VMs hosted by each host of the plurality of hosts.

In one embodiment, the method further comprises determining, subsequent to shutting down the VMs hosted by each host of the plurality of hosts, a condition for re-starting the VMs, determining whether the condition for re-starting the VMs is met, and re-starting, responsive to determining that the condition for re-starting the VMs has been met, the VMs on the virtual SAN cluster. In an embodiment, the condition for re-starting the VMs includes each UPS of the plurality of UPSs being non-critical.

In at least one embodiment, the condition for re-starting the VMs includes a number of critical UPSs of the plurality of UPSs being equal to or less than the fault tolerance level. In one embodiment, the fault tolerance level corresponds to a value indicative of a number of critical UPSs which may be concurrently sustained by the virtual SAN cluster. In embodiments, the method further includes receiving, from a user, the value corresponding to the fault tolerance level.

According to one embodiment, a non-transitory computer-readable medium storing sequences of computer-executable instructions for managing a virtual storage area network cluster including a plurality of hosts is provided, each host of the plurality of hosts executing at least one Virtual Machine (VM) and being configured to receive power from a respective Uninterruptible Power Supply (UPS) of a plurality of UPSs, the sequences of computer-executable instructions including instructions that instruct at least one processor to determine a number of critical UPSs of the plurality of UPSs, each critical UPS of the plurality of UPSs corresponding to a critical host of the plurality of hosts, determine that the number of critical UPSs does not exceed a fault tolerance level, and migrate VMs hosted by the critical hosts to non-critical hosts of the plurality of hosts.

In one embodiment, the instructions are further configured to instruct the at least one processor to shut down, in response to determining that the number of critical hosts exceeds the fault tolerance level, VMs hosted by each host of the plurality of hosts.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
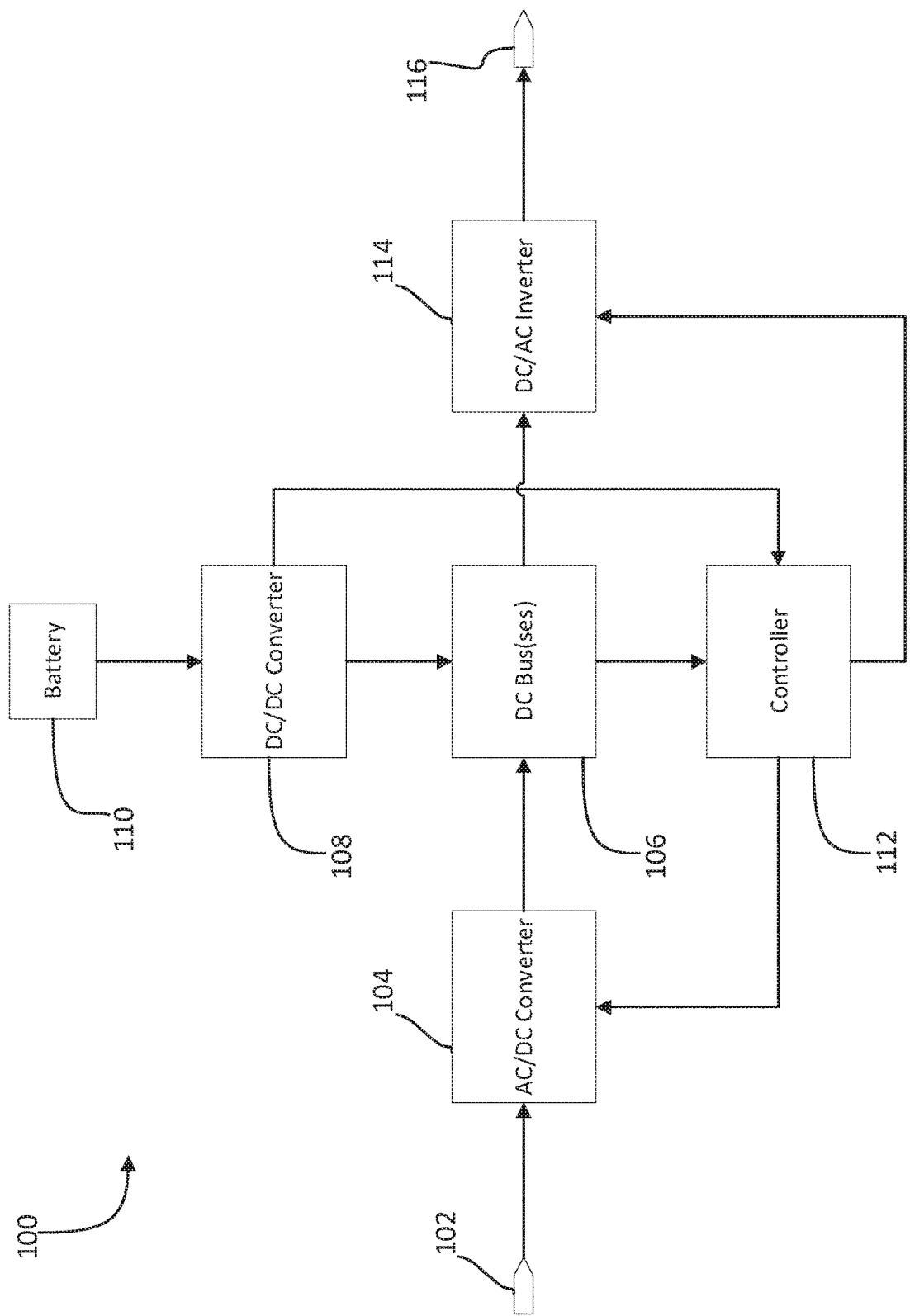
FIG. 1 illustrates a block diagram of an uninterruptible power supply system according to an embodiment.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, Uninterruptible Power Supplies (UPSs) may be used to provide regulated, uninterrupted power to loads. For example, UPSs may be used to provide regulated, uninterrupted power to devices providing software-defined storage. Particularly popular in hyperconverged virtual environments, software-defined storage involves aggregating the Solid-State Drives (SSDs)/Hard Disk Drives (HDDs) of multiple host servers (or "hosts") to provide to provide a virtual Storage Area Network (SAN) datastore on which to host Virtual Machines (VMs). UPSs may be beneficial to ensure that hosts have access to uninterrupted power such that, if a UPS enters a critical mode requiring that the UPS be brought offline (for example, if access to mains power is lost), the corresponding host may safely shut down one or more hosted VMs before the UPS discontinues providing power to the host. As used herein, a critical UPS may refer to a UPS which is subject to a set of conditions (for example, a loss of grid power) which may cause the UPS to shut down and, consequently, stop providing uninterrupted power to a connected load.

In some examples, a critical host (i.e., a host receiving power from a critical UPS) associated with the critical UPS may be part of a virtual SAN cluster including multiple other hosts. Each host is coupled to a respective UPS. Accordingly, the host may be capable of migrating the one or more hosted VMs to another host in the virtual SAN cluster which is still receiving uninterrupted power from a non-critical UPS (i.e., a UPS which is not subject to a set of conditions which may cause the UPS to shut down). If too many of the UPSs providing power to the hosts in the virtual SAN cluster fail, however, it may not be possible to migrate the hosts' VMs to other hosts (for example, because the non-critical hosts do not have a sufficient resource capacity host all of the VMs hosted by critical hosts). In such a scenario, all of the hosts in the virtual SAN cluster may need to safely shut down one or more hosted VMs before UPS power is lost. Accordingly, embodiments disclosed herein provide methods of managing VMs in a virtual SAN cluster according to a number of critical and non-critical UPSs FIG. 1 is a block diagram of a UPS 100. The UPS 100 includes an input 102, an AC/DC converter 104, one or more DC busses 106, a DC/DC converter 108, a battery 110, a controller 112, a DC/AC inverter 114, and an output 116. The input 102 is coupled to the AC/DC converter 104 and an AC power source (not pictured), such as an AC mains power supply. The AC/DC converter 104 is coupled to the input 102 and to the one or more DC busses 106, and is communicatively coupled to the controller 112. The one or more DC busses 106 are coupled to the AC/DC converter 104, the DC/DC converter 108, and to the DC/AC inverter 114, and are communicatively coupled to the controller 112. The DC/DC converter 108 is coupled to the one or more DC busses 106 and to the battery 110, and is communicatively coupled to the controller 112. The battery 110 is coupled to the DC/DC converter 108. The DC/AC inverter 114 is coupled to the one or more DC busses 106 and to the output 116, and is communicatively coupled to the controller 112. The output 116 is coupled to the DC/AC inverter 114, and to an external load (not pictured).

The input 102 is configured to be coupled to an AC mains power source and to receive input AC power having an input voltage level. The UPS 100 is configured to operate in different modes of operation based on the input voltage level of the AC power provided to the input 102. When AC power provided to the input 102 is acceptable (i.e., by having parameters that meet specified values), the UPS 100 operates in a normal mode of operation. In the normal mode of operation, AC power received at the input 102 is provided to the AC/DC converter 104. The AC/DC converter 104 converts the AC power into DC power and provides the DC power to the one or more DC busses 106. The one or more DC busses 106 distribute the DC power to the DC/DC converter 108 and to the DC/AC inverter 114. The DC/DC converter 108 converts the received DC power and provides the converted DC power to the battery 110 to charge the battery 110. The DC/AC inverter 114 receives DC power from the one or more DC busses 106, converts the DC power into regulated AC power, and provides the regulated AC power to the output 116 to be delivered to a load.

When AC power provided to the input 102 from the AC mains power source is not acceptable (i.e., by having parameters that do not meet specified values), the UPS 100 operates in a backup mode of operation. In the backup mode of operation, DC power is discharged from the battery 110 to the DC/DC converter 108. The DC/DC converter 108 converts the received DC power and distributes the DC power amongst the one or more DC busses 106. For example, the DC/DC converter 108 may evenly distribute the power amongst the one or more DC busses 106. The one or more DC busses 106 provide the received power to the DC/AC inverter 114. The DC/AC inverter 114 receives the DC power from the one or more DC busses 106, converts the DC power into regulated AC power, and provides the regulated AC power to the output 116.

Figure 2A:
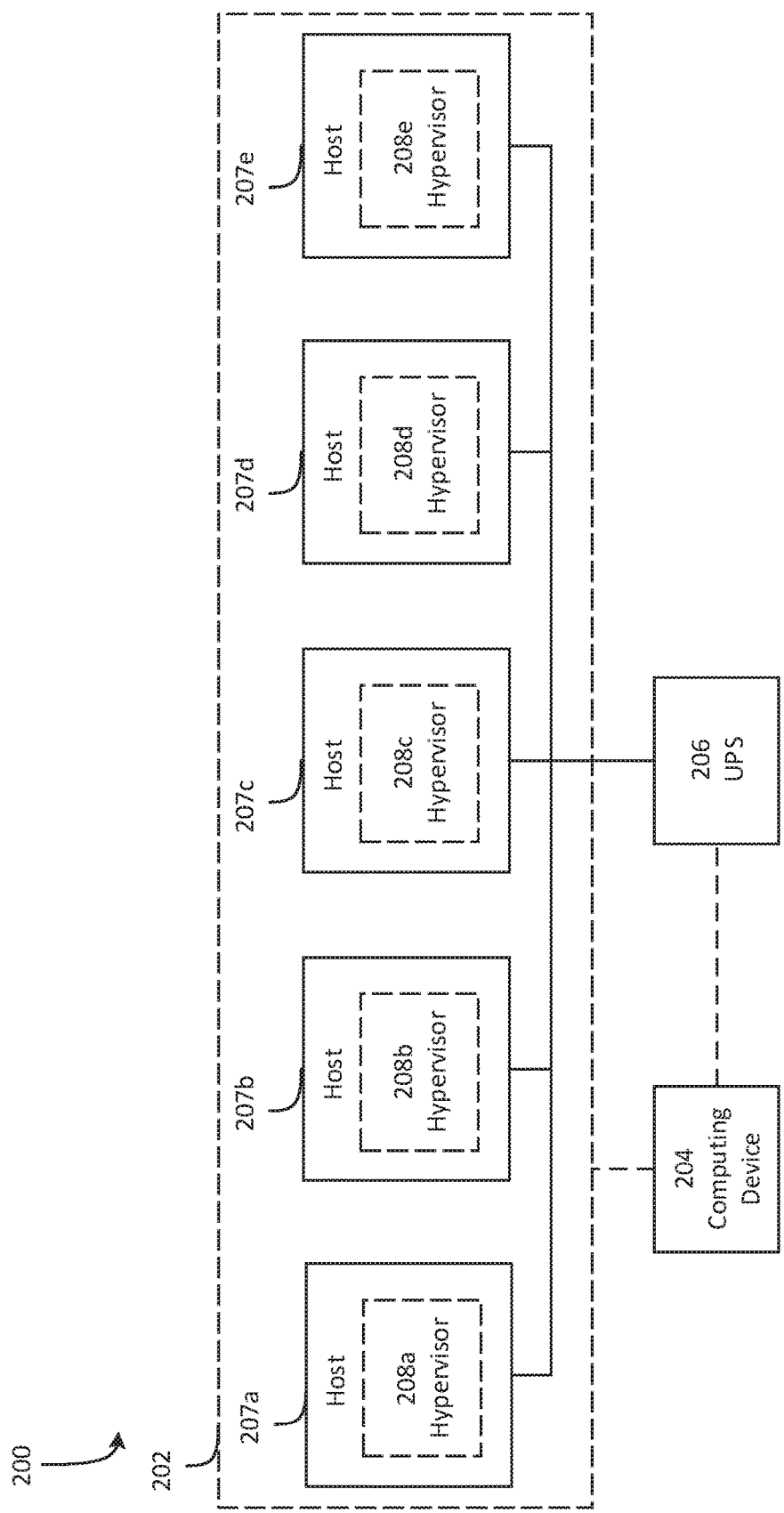
FIG. 2A illustrates a block diagram of a virtual Storage Area Network (SAN) architecture according to a first embodiment.

As discussed above, UPSs such as the UPS 100 may be configured to provide uninterrupted power to loads such as hosts in a virtual SAN cluster. FIG. 2A illustrates a block diagram 200 of a virtual SAN cluster architecture according to a first embodiment. The block diagram 200 includes a virtual SAN cluster 202, a computing device 204, and a UPS 206. The virtual SAN cluster 202 includes hosts 207a-207e, each of which is configured to host a respective hypervisor of hypervisors 208a-208e. Each of the hypervisors 208a-208e is configured to manage one or more VMs, such as by instantiating, or starting, VMs, shutting down VMs, and re-instantiating, or re-starting, VMs which have been previously shut down. The computing device 204 is configured to manage operation of the virtual SAN cluster 202.

The UPS 206 is coupled to, and is configured to provide uninterrupted power to, the computing device 204 and each of the hosts 207a-207e. If the UPS 206 experiences a critical failure (for example, a loss of access to mains power supply), the UPS 206 will, if possible, continue to provide power to the computing device 204 and to the hosts 207a-207e using stored energy from a backup power supply (for example, a battery).

Because the UPS 206 is the only source of uninterrupted power for the hosts 207a-207e, once the UPS 206 is no longer able to provide power to the hosts 207a-207e, the hosts 207a-207e lack access to power. Accordingly, in response to detecting the critical failure of the UPS 206, the computing device 204 may control the hypervisors 208a-208e to initiate a safe shutdown procedure in which each of the hypervisors 208a-208e shuts down hosted VMs before access to power from the UPS 206 is lost.

Figure 2B:
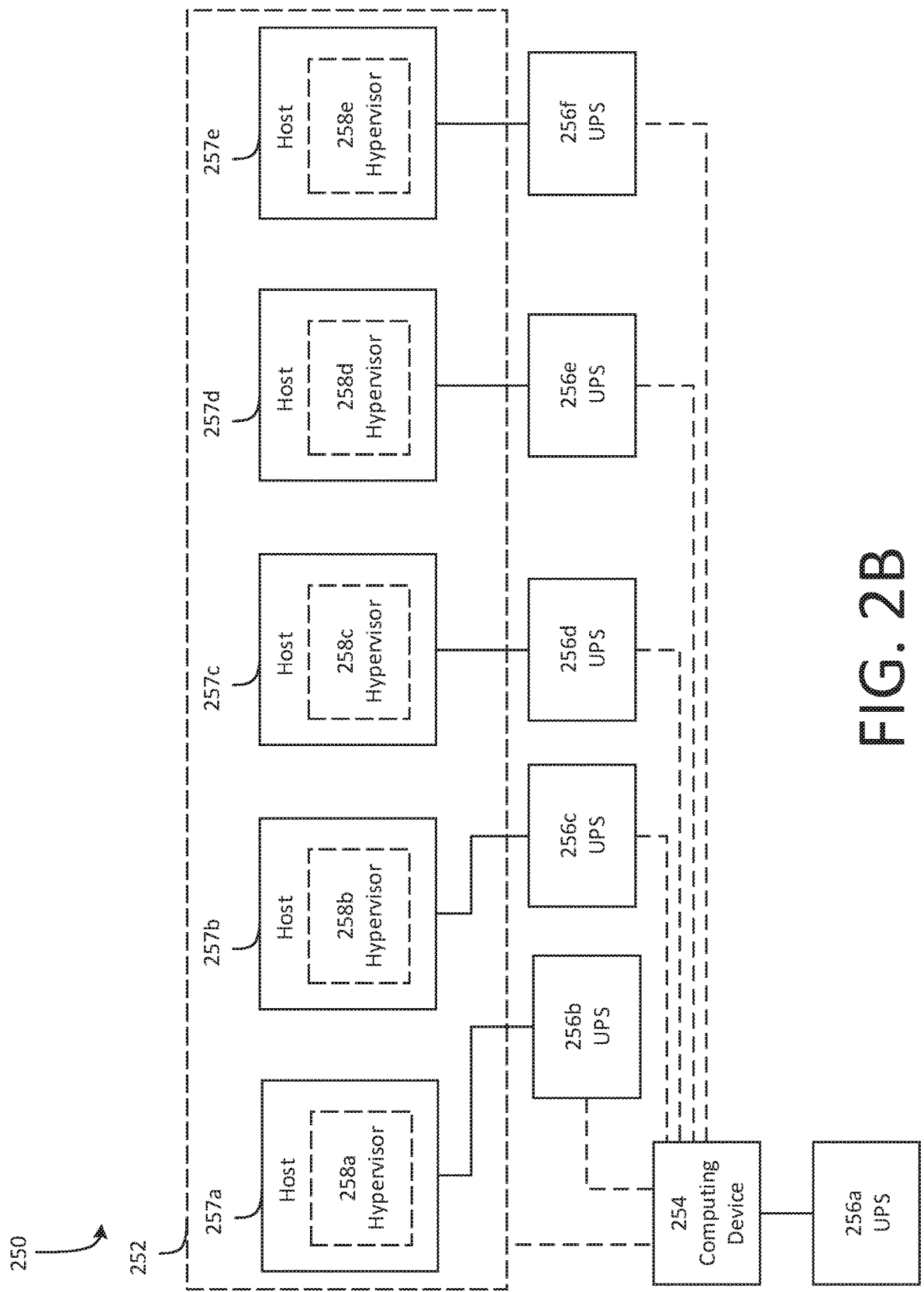
FIG. 2B illustrates a block diagram of a virtual SAN architecture according to a second embodiment.

FIG. 2B illustrates a block diagram 250 of a virtual SAN cluster architecture according to a second embodiment. The block diagram 250 includes a virtual SAN cluster 252, a computing device 254, and a group of UPSs 256a-256f. The virtual SAN cluster 202 includes hosts 257a-257e, each of which executes a respective hypervisor of hypervisors 258a-258e. Each of the hypervisors 258a-258e is configured to manage one or more VMs. The computing device 254 may be communicatively coupled to each of the UPSs 256a-256f and to each of the hypervisors 257a-257e, and is configured to manage operation of the virtual SAN cluster 252.

The block diagram 250 differs from the block diagram 200 at least in that, whereas the UPS 206 is the only source of uninterruptible power to the virtual SAN cluster 202 and the computing device 204, the block diagram 250 includes the group of UPSs 256a-256f. The UPS 256a is coupled to, and is configured to provide uninterrupted power to, the computing device 204, and each of the UPSs 256b-256f is coupled to, and is configured to provide uninterrupted power to, a respective host of the hosts 257a-257e.

As discussed above with respect to FIG. 2A, if the UPS 206 experiences a critical failure, all of the hypervisors 208a-208e initiate a safe shutdown procedure of the one or more VMs hosted by the hypervisors 208a-208e because no alternate source of uninterrupted power is available. Conversely, if one of the UPSs 256b-256f experiences a critical failure, it may not be necessary to shut down all of the VMs hosted by the hypervisors 258a-258e.

For example, if the UPS 256b experiences a critical failure, the host 257a will no longer receive power from the UPS 256b when the UPS 256b shuts down. Accordingly, the hypervisor 258a may initiate a safe shutdown procedure of one or more VMs hosted by the hypervisor 258a. Alternatively, the hypervisor 258a may migrate the one or more VMs to at least one other hypervisor of the hypervisors 258b-258e, each of which may be executed by a host which still has access to uninterrupted power from a corresponding one of the UPSs 256c-256f.

If the UPS 256c subsequently experiences a critical failure after the UPS 256b has experienced a critical failure and the hypervisor 258a has shut down, the hypervisor 258b may initiate a safe shutdown procedure of one or more VMs hosted by the hypervisor 258b. Alternatively, the hypervisor 258b may migrate the one or more VMs to at least one other hypervisor of the hypervisors 258c-258e, each of which may be executed by a host which still has access to uninterrupted power from a corresponding one of the UPSs 256d-256f.

Similar principles may apply to the hypervisors 258c-258e. However, as more of the hypervisors 258a-258e shut down and migrate VMs to a decreasing number of hypervisors, it may not be possible for the decreased number of hypervisors to host all of the VMs. For example, if all of the UPSs 256b-256d experience a critical failure, then each of the hypervisors 258a-258c may attempt to migrate VMs to the hypervisors 258d, 258e. However, the hypervisors 258d, 258e and the hosts 257d, 257e may not have sufficient computing resources to host all of the VMs that the hypervisors 258a-258c are attempting to migrate. Accordingly, it may be advantageous to determine a number of concurrent UPS critical failures that can be tolerated by the virtual SAN cluster 252 before VM migration is no longer desired and, responsive to determining that the number of concurrent UPS critical failures is too high, initiate a safe shutdown of the virtual SAN cluster 252.

Figure 3:
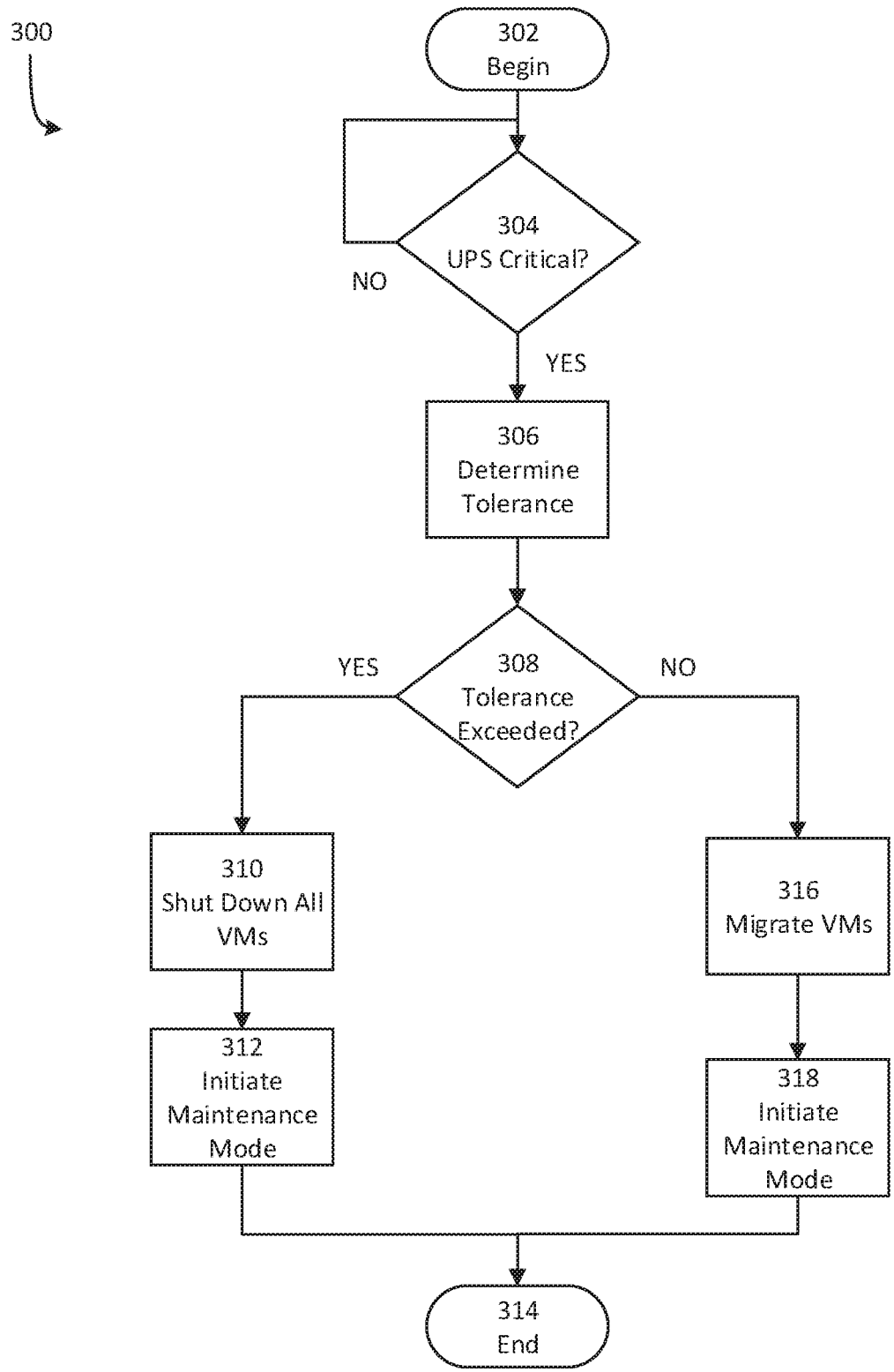
FIG. 3 illustrates a process of controlling a virtual SAN according to an embodiment.

FIG. 3 illustrates a process 300 of managing a virtual SAN cluster according to an embodiment. The process 300 may be executed by the computing device 254 in connection with the virtual SAN cluster 252. For example, the computing device 254 may execute a software application configured to receive information from each of the UPSs 256b-256f and each of the hosts 257a-257e, process the received information, and determine and execute a VM migration or shutdown sequence based on the result of the processing. The process 300 includes acts of determining whether any UPS is experiencing a critical failure, determining a fault tolerance level, determining whether the fault tolerance level has been exceeded, initiating a maintenance mode, and shutting down all or a select group of VMs.

At act 302, the process 300 begins. At act 304, a determination is made as to how many, if any, UPSs are in a critical mode of operation. For example, each of the UPSs 256b-256f may be configured to notify the computing device 254 responsive to detecting a critical failure of the respective UPS. In alternate embodiments, the computing device 254 may query each of the UPSs 256b-256f to determine if any of the UPSs 256b-256f are experiencing a critical failure. If none of the UPSs 256b-256f are in a critical mode of operation (304 NO), then the process 300 returns to act 304. Otherwise (304 YES), the process 300 continues to act 306.

At act 306, a determination is made as to a fault tolerance level. In one example, the fault tolerance level corresponds to a number of concurrent UPS failures which may be sustained by the virtual SAN cluster 252. In another example, the fault tolerance level corresponds to a number of concurrent UPS failures plus a number of non-critical UPS s coupled to hosts in a maintenance mode which may be sustained by the virtual SAN cluster 252. In some examples, the fault tolerance level may be automatically determined by the computing device 254. For example, the computing device 254 may determine a fault tolerance level based on parameters indicative of a status of the virtual SAN cluster 252.

The parameters may include, for example, a number of hosts in the virtual SAN cluster 252, an amount of disk space being used by the virtual SAN cluster 252, a number and type of processors within the virtual SAN cluster 252, a type of application being hosted by the virtual SAN cluster 252, and so forth. The computing device 254 may regularly communicate with the virtual SAN cluster 252 to sample or request parameters indicative of the status of the virtual SAN cluster 252 and, based on the parameters, select a fault tolerance level.

For example, if the computing device 254 determines, based on the parameters, that power or storage requirements for the virtual SAN cluster 252 have increased, then the computing device 254 may determine that the fault tolerance level should be increased or decreased. In another example, if the computing device 254 determines, based on the parameters, that the virtual SAN cluster 252 has begun hosting a highly critical application (for example, an application for which uninterrupted hosting is particularly important, such as a medical database application that is necessary for medical professionals to work with patients), then the computing device 254 may lower a fault tolerance level in response.

In another example, the fault tolerance level may be selected by a user. For example, the computing device 254 may include a user interface through which a user may select a fault tolerance level. The user may select a fault tolerance level of two, for example, indicating that at most two hosts may be down concurrently in the virtual SAN cluster 252 before the virtual SAN cluster 252 is shut down.

In some examples, the computing device 254 may be configured to automatically determine a fault tolerance level in addition to accepting a user selection of a fault tolerance level. For example, a user may select a fault tolerance level, and the computing device 254 may subsequently change the fault tolerance level in response to changing parameters indicative of the status of the virtual SAN cluster 252. The user may restrict the ability of the computing device 254 to change the fault tolerance level. For example, the user may select a fault tolerance level and allow the computing device 254 to raise the fault tolerance level if appropriate, but never to lower the fault tolerance level without user approval. For example, the user may specify that the computing device 254 may automatically change the fault tolerance level within certain bounds, but that the user must be notified and must grant approval for any changes outside of the specified bounds.

At act 308, a determination is made as to whether the fault tolerance has been exceeded. For example, where the fault tolerance level is two, the computing device 254 determines if two or fewer UPSs are experiencing a critical failure. In another example, the computing device 254 may determine if two or fewer UPS s are either experiencing a critical failure, or are coupled to hosts which are in a maintenance mode. Hosts which are in a maintenance mode may not contribute to the total storage in the virtual SAN cluster 252 and may therefore appropriately be treated in a similar manner as hosts coupled to critical UPSs in executing act 308.

If the fault tolerance level has been exceeded (308 YES), then the process 300 continues to act 310. At act 310, all VMs hosted by the virtual SAN cluster 252 are shut down. In a first example of act 310, the computing device 254 may determine at acts 304-308 that the UPSs 256b, 256c are experiencing a critical failure, and that the fault tolerance level is one. Because the number of UPSs experiencing a critical failure is two, and the fault tolerance level is one, the fault tolerance level is exceeded. Accordingly, the computing device 254 controls the hypervisors 258a-258e to initiate a shutdown of all VMs hosted by the hypervisors 258a-258e.

In a second example of act 310, the computing device 254 may determine at acts 304-308 that the UPS 256b is experiencing a critical failure, and that the host 257b, which is coupled to the UPS 256c, is in a maintenance mode and is not hosting any VMs. In an example in which the fault tolerance level is one, the fault tolerance level is exceeded at act 308 because the number of UPSs experiencing a critical failure plus the number of non-critical UPSs coupled to hosts in a maintenance mode is two. Accordingly, at act 310, the computing device 254 controls the hosts 257a, 257c-257e to initiate a shutdown of all hosted VMs. Act 310 may therefore include shutting down VMs on hosts which are not already in a maintenance mode.

At act 312, a maintenance mode is initiated. Continuing with the first example of act 310 discussed above, initiating a maintenance mode may include controlling, by the computing device 254, the hosts 257a, 257b powered by critical UPSs 256b, 256c to enter a maintenance mode. The computing device 254 may be further configured to set a flag on the hosts 257a, 257b indicating that, because the VMs hosted by the virtual SAN cluster 252 are to be shut down, VM disk objects should not be moved off of the disks that are present on hosts 257a, 257b. The hosts may be moved out of a maintenance mode once certain conditions are met, as discussed below with respect to FIG. 4. The process 300 ends at act 314.

Returning to act 308, if the fault tolerance level has not been exceeded (308 NO), then the process 300 continues to act 316. At act 316, VMs are migrated. In a first example of act 316, the computing device 254 may determine at acts 304-308 that the UPSs 256b, 256c are experiencing a critical failure, and that the fault tolerance level is three. Because the number of UPSs experiencing a critical failure is two, and the fault tolerance level is three, the fault tolerance level is not exceeded. Accordingly, the computing device 254 controls the hypervisors 258a, 258b to migrate VMs hosted by the hypervisors 258a, 258b to one or more of the hypervisors 258c-258e responsive to determining that the hosts 257c-257e are coupled to UPSs which are not experiencing a critical event. In some examples, the computing device 254 may be configured to communicate with the hosts 257c-257e to verify that none of the hosts 257c-257e are in a maintenance mode, and thus unable to host VMs which might be migrated from the hosts 257a, 257b.

In a second example of act 316, the computing device 254 may determine at acts 304-308 that the UPS 256b is experiencing a critical failure, and that the host 257b, which is coupled to the UPS 256c, is in a maintenance mode. In an example in which the fault tolerance level is three, the fault tolerance level is not exceeded at act 308 because the number of UPSs experiencing a critical failure plus the number of non-critical UPSs coupled to hosts in a maintenance mode is two. Accordingly, at act 316, the computing device 254 controls the host 257a to initiate a migration of all hosted VMs. Act 316 may therefore include migrating VMs from hosts which are not already in a maintenance mode and therefore not hosting any VMs, and which are coupled to a critical UPS.

At act 318, a maintenance mode is initiated. Continuing with the first example of act 316, initiating a maintenance mode may include controlling, by the computing device 254, the hosts 257a, 257b powered by critical UPSs 256b, 256c to enter a maintenance mode. The computing device 254 is further configured to set a flag on the hosts 257a, 257b indicating that some of the VM disk objects on the disks that are present on hosts 257a, 257b are to be moved to disks present on the other hosts in the cluster. Once the VMs hosted by the hosts 257a, 257b are migrated, the hosts 257a, 257b may be instructed, by the computing device 254, to enter a maintenance mode. The hosts 257a, 257b may be re-started and moved out of a maintenance mode once the hosts 257a, 257b are connected to a UPS that is no longer experiencing an active critical UPS event. The process 300 ends at act 314.

Accordingly, the computing device 254 is configured to communicate with the virtual SAN cluster 252 and the UPSs 256b-256f to determine an availability of hosts which are not in a maintenance mode and are not coupled to critical UPSs and, based on the determination, migrate or shut down VMs. In the event that VMs are migrated to other hosts, the virtual SAN cluster 252 continues executing the same group of VMs, albeit on different hosts. In the event that VMs are shut down and the critical UPSs are taken offline, the computing device 254 executes the process described below with respect to FIG. 4.

Figure 4:
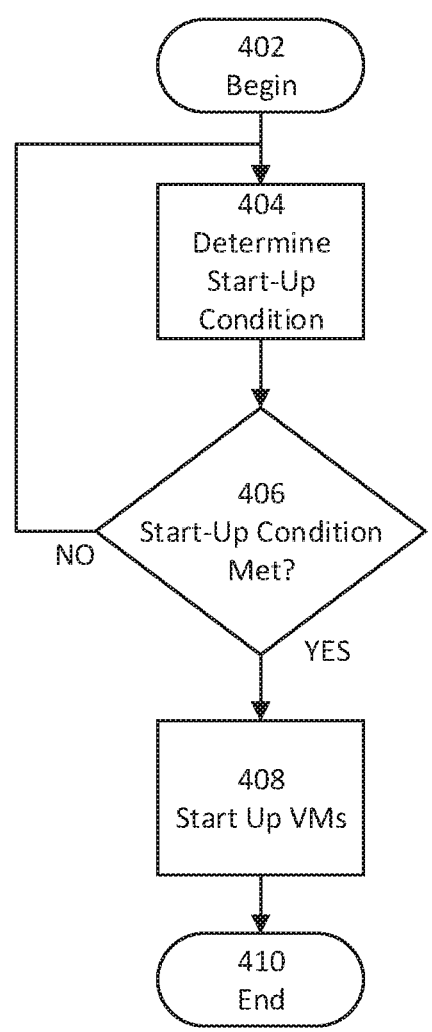
FIG. 4 illustrates a process of operating a virtual SAN which is no longer hosting virtual machines according to an embodiment.

FIG. 4 illustrates a process 400 of operating a virtual SAN cluster which is no longer hosting VMs according to an embodiment. The process 400 may be executed by the computing device 254 in connection with the virtual SAN cluster 252. As discussed above, the virtual SAN cluster 252 shuts down all VMs where the number of concurrent critical UPSs exceeds a fault tolerance level. The process 400 includes acts of determining a start-up condition, determining if the start-up condition has been met, and starting up VMs in response to determining that the start-up condition has been met.

At act 402, the process 400 begins. At act 404, a determination is made as to a start-up condition. The start-up condition indicates a condition which must be met for the VMs which were shut down at act 310 to be re-started. One example of a start-up condition may be that all UPS critical events have been resolved (i.e., such that none of the UPSs 256b-256f are in a critical state). Another example of a start-up condition may be that the number of critical UPSs is equal to or less than the fault tolerance level determined at act 306 (i.e., that a number of critical UPSs of the UPSs 256b-256f is less than or equal to the fault tolerance level). The start-up condition may be selected by a user via the user interface of the computing device 254, which may, in turn, locally store the selection of the start-up condition.

At act 406, a determination is made as to whether the start-up condition has been met. For example, if the start-up condition is that all UPS critical events have been resolved, then the computing device 254 may determine if there are any critical UPSs remaining. If the start-up condition is that the number of critical UPSs is equal to or less than the fault tolerance level, then the computing device 254 may determine if the number of critical UPSs is equal to or less than the fault tolerance level.

If the start-up condition has not been met (406 NO), then the process 400 returns to act 404. Acts 404 and 406 are repeated until it is determined that the start-up condition has been met. If the start-up condition has been met (406 YES), then the process 400 continues to act 408. At act 408, VMs are started up. As discussed above with respect to act 310, all VMs hosted by the virtual SAN cluster 402 are powered down responsive to determining that the fault tolerance level has been exceeded (308 YES). Accordingly, at act 408, the VMs previously shut down at act 310 are re-started (i.e., re-instantiated) at act 408 responsive to determining that the virtual SAN cluster 252 is again capable of hosting the VMs. The process 400 ends at act 410.

Examples provided above discuss a lack of access to utility mains power as a reason for classifying a UPS as being in a critical condition. In other examples, a UPS may be considered to be in a critical mode of operation for other reasons. For example, the computing device 254 may be coupled to one or more sources of data, which may respectively include one or more sensors, such as environmental sensors. The one or more sources of data may determine, based on data collected by the one or more sources of data, that a UPS is in a critical condition and inform the computing device 254 of the UPS's criticality.

For example, the one or more sources of data may include a data source including temperature and humidity sensors. The data source may be positioned proximately to a UPS. The data source may determine, based on data collected by the temperature and humidity sensors, that a fire is present near the UPS. The data source may subsequently communicate with the computing device 254 to indicate that, because of the nearby fire, the UPS is in a critical mode of operation, which the computing device 254 may address in accordance with the processes discussed above.

In other examples, other entities having information pertinent to the operations or condition of UPS s coupled to the computing device 254 may provide information pertinent to the criticality of the UPSs to the computing device 254. Furthermore, a UPS may itself determine that it is in a critical mode of operation, such as because of a lack of access to mains power, a lack of access to backup power, a determination that one or more components of the UPS have failed, or any other determination relevant to the ability of the UPS to operate effectively.

In other examples, hosts may be transitioned into a maintenance mode for reasons other than the criticality of the UPSs coupled to the hosts. For example, the computing device 254 may be coupled to one or more sources of data, which may respectively include one or more sensors, such as environmental sensors. The one or more sources of data may determine, based on data collected by the one or more sources of data, that a host should be transitioned into a maintenance mode of operation.

For example, the one or more sources of data may include a data source including temperature and humidity sensors. The data source may be positioned proximately to a host. The data source may determine, based on data collected by the temperature and humidity sensors, that a fire is present near the host. The data source may subsequently communicate with the computing device 254 to indicate that, because of the nearby fire, the host should discontinue hosting VMs and be transitioned into a maintenance mode, which the computing device 254 may address in accordance with the processes discussed above.

Examples provided herein enable a group of VM hosts each connected to a respective UPS to continue hosting VMs despite the failure of one or more of the hosts or UPSs. Whereas in conventional solutions all of the VMs hosted by a virtual SAN cluster may be shut down in response to detecting a single host or UPS failure, embodiments of the present disclosure determine a fault tolerance level and, based on the fault tolerance level, manage operation of the virtual SAN cluster VMs.

One or more host or UPS failures may not impact operation of the VMs at all, such as where a fault tolerance level is not exceeded and the VMs hosted by critical hosts are migrated to other non-critical hosts. Accordingly, embodiments of the present disclosure provide material enhancements to computer operations at least because VMs may be subject to considerably lower downtime and, in some cases, zero downtime. More specifically, downtime is reduced because VMs may continue to be hosted by a virtual SAN cluster despite failure of a UPS, which conventional systems may respond to by immediately shutting down all VMs in the virtual SAN cluster. By reducing VM host downtime, VMs are significantly more reliable. Users of VMs may therefore be more confident that access to VMs will not be interrupted for critical operations, thus providing significant improvements to VM-based computer systems.

Moreover, although some of the foregoing examples are directed to applications with respect to virtual SAN clusters, other examples may be applicable to the embodiments disclosed above. For example, the embodiments disclosed above may be applicable to any situation in which UPSs are providing uninterruptible power to loads which are capable of migrating programs executed by the loads to other loads. Accordingly, the embodiments disclosed above should not be construed as being limited solely to virtual SAN clusters.

Embodiments disclosed above have provided examples in which, after a fault tolerance level is exceeded, all VMs hosted by a virtual SAN cluster are shut down. In other embodiments, a subset of the VMs hosted by the virtual SAN cluster may be shut down. For example, a computing device managing the virtual SAN cluster may determine a criticality of VMs hosted by each host of a group of hosts and, based on the criticality, select a subset of the VMs to shut down. The computing device may determine, for example, to shut down a group of lowest-criticality VMs which are less important to continue operating as compared to other VMs. The computing device may determine how many VMs to shut down based on, amongst other factors, a remaining computing resource capacity of the virtual SAN cluster.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A system for operating a virtual Storage Area Network (SAN), the system comprising:
   a virtual SAN cluster comprising a plurality of hosts,
      wherein each host of the plurality of hosts is configured to execute a hypervisor, and
      wherein each hypervisor is configured to manage at least one Virtual Machine (VM);
   a plurality of Uninterruptible Power Supplies (UPSs), each UPS of the plurality of UPSs being coupled to a respective host of the plurality of hosts, and being configured to provide power to the respective host; and
   a computing device being communicatively coupled to the virtual SAN cluster and to the plurality of UPSs, and being configured to:
      determine that the plurality of UPSs includes a first group of critical UPSs and a second group of non-critical UPSs;
      determine whether a number of UPSs in the first group of critical UPSs exceeds a fault tolerance level, wherein the fault tolerance level comprises a threshold number of UPSs; and
      migrate, in response to determining that the number of UPSs in the first group of critical UPSs does not exceed the fault tolerance level, VMs managed by hypervisors executed by respective hosts coupled to the first group of critical UPSs to hypervisors executed by respective hosts coupled to the second group of non-critical UPSs.

2. The system of claim 1, wherein the computing device is further configured to:
   control the hosts coupled to the first group of critical UPSs to enter a maintenance mode after migrating the VMs to the hypervisors executed by respective hosts coupled to the second group of non-critical UPSs.

3. The system of claim 1, wherein the computing device is further configured to:
   shut down, in response to determining that the number of UPSs in the first group of critical UPSs exceeds the fault tolerance level, VMs hosted by each host of the plurality of hosts.

4. The system of claim 3, wherein the computing device is further configured to:

control the hosts coupled to the first group of critical UPSs to enter a maintenance mode after shutting down the VMs hosted by each host of the plurality of hosts.

5. The system of claim 3, wherein the computing device is further configured to:
determine, subsequent to shutting down the VMs hosted by each host of the plurality of hosts, a condition for re-starting the VMs;
determine whether the condition for re-starting the VMs is met; and
re-start, responsive to determining that the condition for re-starting the VMs has been met, the VMs on the virtual SAN cluster.

6. The system of claim 5, wherein the condition for re-starting the VMs includes each UPS of the plurality of UPSs being non-critical.

7. The system of claim 5, wherein the condition for re-starting the VMs includes a number of critical UPSs of the plurality of UPSs being equal to or less than the fault tolerance level.

8. The system of claim 1, wherein the fault tolerance level corresponds to a value indicative of a number of critical UPSs which may be concurrently sustained by the virtual SAN cluster.

9. The system of claim 8, wherein the computing device includes a user interface, and wherein the computing device is further configured to determine the fault tolerance level, wherein determining the fault tolerance level includes at least one of:
receiving, via the user interface, the value corresponding to the fault tolerance level; and
automatically calculating, by the computing device, the value corresponding to the fault tolerance level.

10. A method of operating a virtual Storage Area Network (SAN) cluster including a plurality of hosts, each host of the plurality of hosts executing a hypervisor being configured to manage at least one Virtual Machine (VM) and being configured to receive power from a respective Uninterruptible Power Supply (UPS) of a plurality of UPSs, the method comprising:
determining that the plurality of UPSs includes a first group of critical UPSs, each critical UPS of the plurality of UPSs corresponding to a critical host of the plurality of hosts and a second group of non-critical UPSs;
determining whether a number of UPSs in the first group of critical UPSs exceeds a fault tolerance level, wherein the fault tolerance level comprises a threshold number of UPSs; and
migrating, in response to determining that the number of UPSs in the first group of critical UPSs does not exceed the fault tolerance level, VMs managed by hypervisors executed by respective hosts coupled to the first group of critical UPSs to hypervisors executed by respective hosts coupled to the second group of non-critical UPSs.

11. The method of claim 10, further comprising controlling the critical hosts to enter a maintenance mode after migrating the VMs to the non-critical hosts.

12. The method of claim 10, further comprising shutting down, in response to determining that the number of critical hosts exceeds the fault tolerance level, VMs hosted by each host of the plurality of hosts.

13. The method of claim 12, further comprising controlling the critical hosts to enter a maintenance mode after shutting down the VMs hosted by each host of the plurality of hosts.

14. The method of claim 12, further comprising:
determining, subsequent to shutting down the VMs hosted by each host of the plurality of hosts, a condition for re-starting the VMs;
determining whether the condition for re-starting the VMs is met; and
re-starting, responsive to determining that the condition for re-starting the VMs has been met, the VMs on the virtual SAN cluster.

15. The method of claim 14, wherein the condition for re-starting the VMs includes each UPS of the plurality of UPSs being non-critical.

16. The method of claim 14, wherein the condition for re-starting the VMs includes a number of critical UPSs of the plurality of UPSs being equal to or less than the fault tolerance level.

17. The method of claim 10, wherein the fault tolerance level corresponds to a value indicative of a number of critical UPSs that may be concurrently sustained by the virtual SAN cluster.

18. The method of claim 17, further comprising at least one of:
receiving, from a user, the value corresponding to the fault tolerance level; and
automatically determining the fault tolerance level.

19. A non-transitory computer-readable medium storing sequences of computer-executable instructions for managing a virtual storage area network cluster including a plurality of hosts, each host of the plurality of hosts executing a hypervisor being configured to manage at least one Virtual Machine (VM) and being configured to receive power from a respective Uninterruptible Power Supply (UPS) of a plurality of UPSs, the sequences of computer-executable instructions including instructions that instruct at least one processor to:
determine that the plurality of UPSs includes a first group of critical UPSs, each critical UPS of the plurality of UPSs corresponding to a critical host of the plurality of hosts and a second group of non-critical UPSs;
determine whether a number of UPSs in the first group of critical UPSs exceeds a fault tolerance level, wherein the fault tolerance level comprises a threshold number of UPSs; and
migrating, in response to determining that the number of UPSs in the first group of critical UPSs does not exceed the fault tolerance level, VMs managed by hypervisors executed by respective hosts coupled to the first group of critical UPSs to hypervisors executed by respective hosts coupled to the second group of non-critical UPSs.

20. The non-transitory computer-readable medium of claim 19, wherein the instructions are further configured to instruct the at least one processor to shut down, in response to determining that the number of critical hosts exceeds the fault tolerance level, VMs hosted by each host of the plurality of hosts.

* * * * *